United States Patent
Yamaguchi et al.

(10) Patent No.: US 10,675,807 B2
(45) Date of Patent: Jun. 9, 2020

(54) TOOL FOR FIXING A TEXTILE SLEEVE ABOUT AN ELONGATE MEMBER TO BE PROTECTED AND METHOD OF USE THEREOF

(71) Applicant: FEDERAL-MOGUL POWERTRAIN LLC, Southfield, MI (US)

(72) Inventors: Hiroki Yamaguchi, Kanagawa (JP); Shozo Fukuyama, Tokyo (JP)

(73) Assignee: Federal-Mogul Powertrain LLC, Southfield, MI (US)

( * ) Notice: Subject to any disclaimer, the term of this patent is extended or adjusted under 35 U.S.C. 154(b) by 0 days.

(21) Appl. No.: 16/418,386

(22) Filed: May 21, 2019

(65) Prior Publication Data

US 2019/0270238 A1 Sep. 5, 2019

Related U.S. Application Data

(62) Division of application No. 15/282,366, filed on Sep. 30, 2016, now Pat. No. 10,300,655.

(Continued)

(51) Int. Cl.
| | |
|---|---|
| *B29C 63/00* | (2006.01) |
| *H02G 15/18* | (2006.01) |
| *B29C 63/18* | (2006.01) |
| *B29C 65/48* | (2006.01) |
| *B29C 65/00* | (2006.01) |

(Continued)

(52) U.S. Cl.
CPC .......... *B29C 63/0004* (2013.01); *B29C 63/18* (2013.01); *B29C 65/4835* (2013.01); *B29C 66/5324* (2013.01); *H02G 15/1813* (2013.01); *B29C 33/048* (2013.01); *B29C 35/049* (2013.01); *B29C 63/044* (2013.01); *B29C 63/06* (2013.01); *B29C 63/065* (2013.01);
(Continued)

(58) Field of Classification Search
CPC ............ H01B 13/012; H01B 13/01209; H01B 13/01254; B29C 35/049; B32B 2310/049; Y10T 156/1008; Y10T 156/103; Y10T 156/1033; Y10T 156/18
See application file for complete search history.

(56) References Cited

U.S. PATENT DOCUMENTS

| | | | |
|---|---|---|---|
| 4,205,221 A | 5/1980 | Meyer | |
| 8,733,373 B2 * | 5/2014 | Vacheron | A45D 1/04 132/228 |

(Continued)

FOREIGN PATENT DOCUMENTS

CN 102708961 A1 10/2012

*Primary Examiner* — Carson Gross
(74) *Attorney, Agent, or Firm* — Robert L. Stearns; Dickinson Wright, PLLC (57) ABSTRACT

A tool for fixing a protective textile sleeve about an elongate member contained therein and method of use thereof is provided. The tool includes a clamp assembly having opposed clamp members attached to one another for pivotal movement relative to one another between an open state and a closed state. The clamp members have clamping surfaces, wherein at least one of the clamping surfaces has at least one outlet. A fluid source is arranged in fluid communication with the at least one outlet, and a heat source is configured to heat fluid from the fluid source to create steam. The steam is dispensed outwardly from the at least one outlet to cause an adhesive on the sleeve to become activated to bond with an adjacent abutting surface.

11 Claims, 6 Drawing Sheets

Related U.S. Application Data (60) Provisional application No. 62/235,767, filed on Oct. 1, 2015.

(51) Int. Cl.

| | | |
|---|---|---|
| *B29C 33/04* | (2006.01) | |
| *H01B 13/012* | (2006.01) | |
| *B29C 63/06* | (2006.01) | |
| *B29C 35/04* | (2006.01) | |
| *B29C 63/04* | (2006.01) | |
| *B29L 23/00* | (2006.01) | |

(52) U.S. Cl.
CPC ..... *B29L 2023/00* (2013.01); *B32B 2310/049* (2013.01); *H01B 13/012* (2013.01); *H01B 13/01209* (2013.01); *Y10T 156/101* (2015.01); *Y10T 156/103* (2015.01); *Y10T 156/1008* (2015.01); *Y10T 156/1033* (2015.01)

(56) References Cited

U.S. PATENT DOCUMENTS

| | | | |
|---|---|---|---|
| 2010/0199528 A1* | 8/2010 | Fabrikant | D06F 71/32 38/15 |
| 2013/0020125 A1* | 1/2013 | Murata | H02G 3/0487 174/72 A |
| 2015/0107748 A1* | 4/2015 | Suzuki | H01B 13/0129 156/50 |
| 2015/0340132 A1* | 11/2015 | Kitada | H01B 13/012 29/825 |

* cited by examiner

TOOL FOR FIXING A TEXTILE SLEEVE ABOUT AN ELONGATE MEMBER TO BE PROTECTED AND METHOD OF USE THEREOF

CROSS-REFERENCE TO RELATED APPLICATION

This U.S. Divisional Patent Application claims the benefit of U.S. Utility application Ser. No. 15/282,366, filed Sep. 30, 2016, which claims the benefit of U.S. Provisional Application Ser. No. 62/235,767, filed Oct. 1, 2015, both of which are incorporated herein by reference in their entirety.

BACKGROUND OF THE INVENTION

1. Technical Field

This invention relates generally to protective textile sleeves for providing protection to elongate members contained therein, and more particularly to a tool for fixing a protective textile sleeve to itself and/or to an elongate member extending therethrough.

2. Related Art

Protective textile sleeves for providing protection to elongate members extending therethrough are known. Typically, the protective sleeves are formed having one of a tubular wall with a circumferentially continuous wall; a wrappable wall with opposite lengthwise extending edges configured to be wrapped into overlapping relation with one another in "cigarette" fashion, or of an elongate spirally wrapped strip. Depending on the type of aforementioned wall and end use, a portion of the sleeve can be fixed to itself or the elongate member extending therethrough via separately applied wrapped tape or glue applied during installation. The use of tape to secure the sleeve in place has various drawbacks, as it is costly from a material and labor standpoint, and it can also prove unsightly if not applied correctly. Further, the externally applied tape must be inventoried and readily available during installation of the sleeve, otherwise the assembly process can be delayed, and further yet, the tape can become inadvertently damaged or ineffectively applied during assembly, such as by being inadvertently folded on itself or contaminated via dirty surroundings or hands during application, thus, adversely affecting the ability of the tape to reliably fix the sleeve in place for the duration of its useful life, as intended. Likewise, the application of separately applied glue during assembly is also costly from a material and labor standpoint, and further requires being inventoried and readily available during assembly of the sleeve, and can further add cost as a result of the need to provide drying time for the glue. In addition, glue typically lacks strength at elevated temperatures, and can prove messy in assembly, thereby leading to further cost associated with damage, repair and the necessary clean-up thereof, and can further have a degree of toxicity and/or odor. In addition to the aforementioned drawbacks, both known mechanisms discussed above can be time consuming in process, which ultimately adds cost to the process.

SUMMARY OF THE INVENTION

In accordance with one aspect of the invention, a tool for fixing a protective textile sleeve about an elongate member contained therein is provided. The tool includes a clamp assembly having opposed clamp members attached to one another for pivotal movement relative to one another between an open state and a closed state. The clamp members have clamping surfaces, wherein at least one of the clamping surfaces has at least one outlet. A fluid source is arranged in fluid communication with the at least one outlet, and a heat source is configured to heat fluid from the fluid source to create steam. The steam is dispensed outwardly from the at least one outlet to cause an adhesive on the sleeve to become activated to bond with an adjacent abutting surface.

In accordance with another aspect of the invention, the tool can be provided with a plurality of outlets through which steam is dispensed.

In accordance with another aspect of the invention, each of the opposed clamp members can include a plurality of outlets through which steam is dispensed.

In accordance with another aspect of the invention, the tool has a handle operably attached to the opposed clamp members, wherein the source of fluid can be at least partially contained in the handle.

In accordance with another aspect of the invention, the source of fluid can be contained entirely within the handle.

In accordance with another aspect of the invention, the source of fluid can be contained at least in part externally from clamping tool.

In accordance with another aspect of the invention, the tool can be configured to be hand held.

In accordance with another aspect of the invention, the tool can be automated.

In accordance with another aspect of the invention, the clamp members can be spring biased toward one of the open and closed states.

In accordance with another aspect of the invention, a lever can be pivotally attached to one of said clamp members, with the lever having a fully released position, a fully compressed position, and an intermediate position, wherein the clamp members can be biased into the open state when the lever is in the intermediate position and being biased into the closed state when the lever is in the fully released and fully compressed positions.

In accordance with another aspect of the invention, a method of fixing a protective textile sleeve about an elongate member is provided. The method includes providing the protective textile sleeve having an inner surface configured to bound an inner, cavity and disposing the elongate member within the inner cavity. Further, clamping at least a portion of the protective textile sleeve about the elongate member with opposed clamp members. Then, dispensing steam from at least one of the clamp members and activating an adhesive with the steam and bonding the inner surface of the textile sleeve to at least another portion of the textile sleeve and/or to the elongate member.

In accordance with another aspect of the invention, the method can further include bringing concave clamping surfaces of the clamp members into engagement with an outer surface of the sleeve while activating the adhesive with steam.

In accordance with another aspect of the invention, the method can further include dispensing steam from a plurality of outlets formed in the clamp members to activate the adhesive.

In accordance with another aspect of the invention, the method can further include providing the source of fluid at least partially contained in a handle attached to the clamp members.

In accordance with another aspect of the invention, the method can further include providing the source of fluid contained entirely within the handle.

In accordance with another aspect of the invention, the method can further include providing the source of fluid contained at least in part externally from the handle.

In accordance with another aspect of the invention, the method can further include operably fixing the tool in place for automation on an assembly line.

In accordance with another aspect of the invention, the method can further include spring biasing the clamp members away from one another to facilitate disposing the elongate member between the clamp members.

In accordance with another aspect of the invention, the method can further include spring biasing the clamp members toward one another to facilitate clamping the elongate member.

BRIEF DESCRIPTION OF THE DRAWINGS

These and other aspects, features and advantages of the present invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
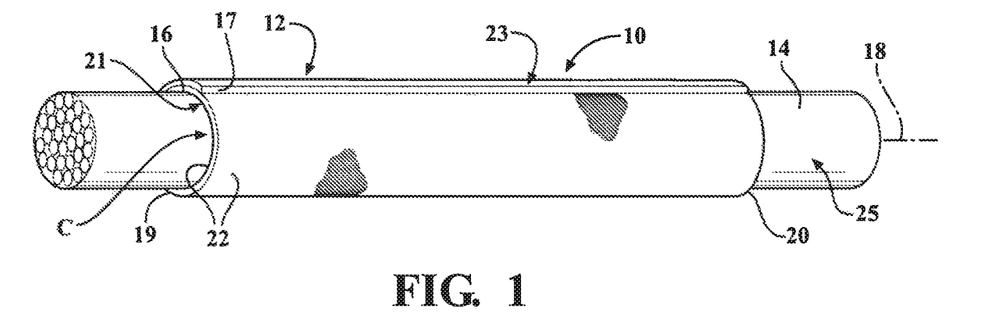
FIG. 1 is a perspective view of a wrappable protective sleeve shown fixed about an elongate member by a clamping tool constructed in accordance with one aspect of the invention.
Figure 1A:
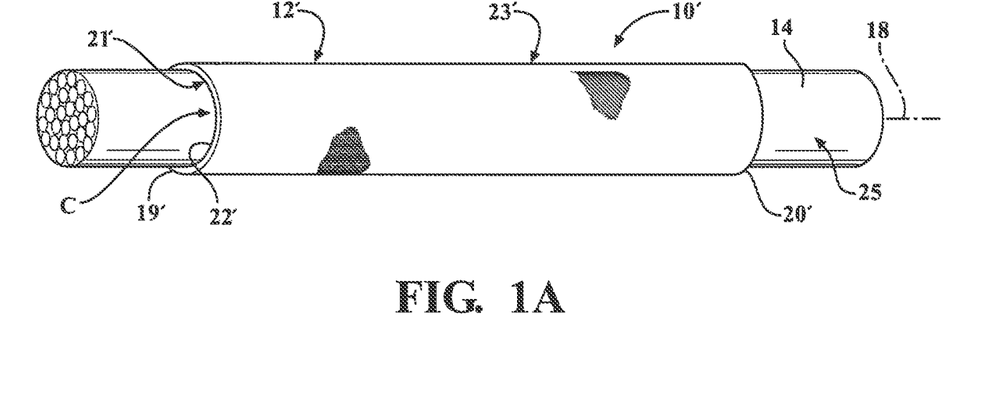
FIG. 1A is a perspective view of a circumferentially continuous, seamless protective sleeve shown fixed about an elongate member by a clamping tool constructed in accordance with another aspect of the invention.

Referring in more detail to the drawings, FIGS. 1 and 1A illustrate textile sleeves constructed in accordance with one aspect of the invention, shown as a wrappable sleeve 10 in FIG. 1 and as a circumferentially continuous, seamless sleeve 10' in FIG. 1A, and referred to hereafter commonly as sleeve, unless noted otherwise. The reference numerals used to identify the features of the sleeves 10, 10' are the same, with the exception that the reference numerals of the sleeve 10' are primed (') to distinguish between the different embodiments. The sleeve 10 has a wrappable wall 12, such as a wrappable or self-wrapping elongate wall that automatically curls into, its wrapped configuration absent some externally applied force, while the sleeve 10' has a circumferentially continuous, seamless wall 12', both for routing and protecting elongate members 14, such as a cable, wire harness, or tube, by way of example and without limitation. The elongate wall 12 has opposite inner and outer free edges 16, 17 extending generally parallel to a central, longitudinal axis 18 between opposite open ends 19, 20, wherein the edges 16, 17 can be manually wrapped or self-biased into overlapping relation with one another in "cigarette wrapped" fashion to fully enclose the elongate member(s) 14 within a central cavity C of the sleeve 10. The walls 12, 12' have an innermost face or surface, also referred to as inner surface 21, 21' and an outermost face or surface, also referred to as outer surface 23, 23', wherein the cavity C is bounded by the innermost surface 21, 21', and for the wrappable sleeve 10, the cavity C is readily accessible along the full length of the longitudinal axis 18 so that the elongate member(s) 14 can be readily disposed radially into the cavity C, and conversely, removed from the cavity C, such as during service. To adhere and fix the wall 12 to itself to maintain the wall 12 in its closed, wrapped configuration and/or to the elongate member 14 to prevent relative movement between the wall 12, 12' and the elongate member 14, and further, to facilitate preventing end fray of the opposite ends 19, 19', 20, 20' such as during cold cutting in manufacture and also during in use, the wall 12, 12' has an adhesive coating layer, referred to hereafter as adhesive coating 22, 22', bonded to at least a portion of at least one of the innermost surface 21, 21' and/or the outermost surface 23, 23'. The adhesive coating 22, 22' can be provided as a heat activateable and/or water activateable coating having a first, dried non-adhesive state upon first being applied to the wall 12, 12' and second, activated adhesive state, wherein the second state is activated at a chosen time and location via a clamping tool 24 (FIGS. 2-4) constructed in accordance with the invention.

Depending on the application needs, the wall 12, 12' can be constructed having any suitable size, including length and diameter, wherein the tool 24 is adjustable to accommodate the size of the sleeve 10, 10'. Further, the wall 12, 12' can be formed of interlaced yarn using any desired interlacing process, such as braiding, weaving or knitting. If the wall 12 is formed as a self-wrapping wall, at least some of the weft-wise, circumferentially extending yarn, whether multifilament and/or monofilament, can be provided as any suitable heat-settable polymeric material, such as polyphenylene sulfide (PPS) or polyethyleneterephthalate (PET), for example.

To apply the mixture of the coating 22 to the wall 12, the mixture can be first formed as a pre-formed solid sheet of the coating 22 fabricated from the mixture, whereupon the solid sheet of the coating 22 can be subsequently laminated to the innermost surface 21 of the wall 12. Otherwise, the coating 22, 22' of the mixture can be applied as a low viscosity coating formulation or high viscosity coating formulation, such as via a spraying, rolling or dipping processes, by way of example and without limitation, directly on the desired area of the innermost and/or outermost surfaces 21, 21', 23, 23' of the sleeve 10, 10'. Of course, it should be recognized the coating 22, 22' can be applied to the entirety of the wall 12, 12', if desired. When relative movement between the sleeve 10, 10' and the elongate member 14 is to be prevented, the mixture of the coating 22, 22' is applied and bonded to at least a portion of the innermost surface 21, 21' that abuts directly against the elongate member 14, thereby providing the ability to bond the adhesive coating 22, 22' to an outer surface 25 of the elongate member 14 via activation by the clamping tool 24.

Upon applying, bonding, and drying the coating 22 to the desired areas of the wall 12, the wall 12 can be subsequently heat-set into a self-wrapping wall and/or wrapped about the elongate member 14. Otherwise, it should be recognized that the wall 12 can first be heat-set into a self-wrapping wall and then the wall 12 can be sprayed, dipped or otherwise coated with mixture of coating 22 in the desired areas.

It should be recognized that upon the coating 22, 22' being applied to the wall 12, 12', the coating 22, 22° attains its first, non-adhesive state upon being dried, and then, when desired, including after storing in inventory and/or shipping to the desired location where the sleeve 10, 10' is to be disposed about the elongate member 14, the coating 22, 22' can be selectively activated, to form a bond with the desire surface via the clamping tool 24.

It should be recognized the coating 22 can be applied along one or both of the edges 16, 17, such that upon wrapping the wall 12 about the elongate member 14, the coating 22 can be bonded to the outer surface 25 of the elongate member 14 and/or to the outer surface 23 of the wall 12 to fix the opposite edges 16, 17 in overlapping relation with one another. It should also be recognized that the coating 22, 22' can be applied to virtually any region of the wall 12, 12', whether in part or entirely about the wall 12, 12', to enable the coated portion or entirety of the wall 12, 12' to be bonded to another surface via the clamping tool 24.

The clamping tool 24 has a clamp assembly 26 having opposed clamp members 28, 30. &t least one or, both of the clamp members 28 have at least one or a plurality of fluid outlets, referred to hereafter simply as outlets shown generally at 32, wherein the outlets 32 are formed within gripping or clamping surfaces of clamping jaws 34. A fluid source 36 is arranged in fluid communication with at least one or a plurality of the outlets 32. The fluid source 36 can be self-contained with a handle 37 of the clamping tool 24, and/or it can be remote and configured in fluid communication with the tool 24 via a conduit 39. A heat source 38 is configured to heat fluid from the fluid source 36 to vaporize the fluid and form steam, wherein the steam is selectively dispensed outwardly from the outlet or outlets 32. The heat source 38 can be powered via any suitable external energy source 41, such as 100-110V AC, by way of example and without limitation. It should be recognized that a battery DC power source 41 could also be used, wherein the power source can be self-contained, such as in the handle 37, by way of example and without limitation. The heat source 38 can be provided as any suitable heating element, such as a ceramic plate type heater or otherwise. It is contemplated the temperature of heat generated by the heat source 38 is suitable to generate steam from the fluid source 36, such as about 190° C., by way of example and without limitation. Of course, depending on the type of adhesive being activated, the temperature can be selected as necessary.

The clamp members 28, 30 are pivotally connected to one another at a pivot axis 42, and are actuatable to move relative to one another between a closed, non-activated state or position (FIGS. 2 and 3) to an open state or position (FIGS. 4 and 5) to a fully activated, closed state or position (FIG. 6), and then return to the non-activated state. While in the open position, the sleeve 10, 10' can be readily inserted and removed from between the clamping jaws 34, and while in the fully activated, closed position, the clamping jaws 34 are brought into clamping contact with the outer surface 23, 23' of the respective sleeve 10, 10'.

To facilitate actuating the clamping tool 24 to move from the closed, non-activated position (FIGS. 2 and 3) to the open position (FIGS. 4 and 5) and then to the fully activated, closed position (FIG. 6), a lever 44 is pivotally connected to one of the clamp members 30 via a pivot pin 45 and operably connected to at least one of the clamp members 28, 30 via a link lever or mechanism 46. The link mechanism 46 is shown as being pivotally attached to one of the clamp members 28 via a pivot pin 47, wherein the link mechanism 46 is shown as having a generally L-shaped slot or notch 48, including a first arm 52 and a second arm 54 extending generally transversely to one another, for sliding receipt of a pin 50 therein. To facilitate guiding the link mechanism 46 during actuation, a guide pin 56 is fixed to the clamp member 30 for sliding abutment against the link mechanism 46. The pin 50 is operably fixed to the lever 44 away, from the pivot pin 45 for conjoint movement with the lever 44.

Figure 2:
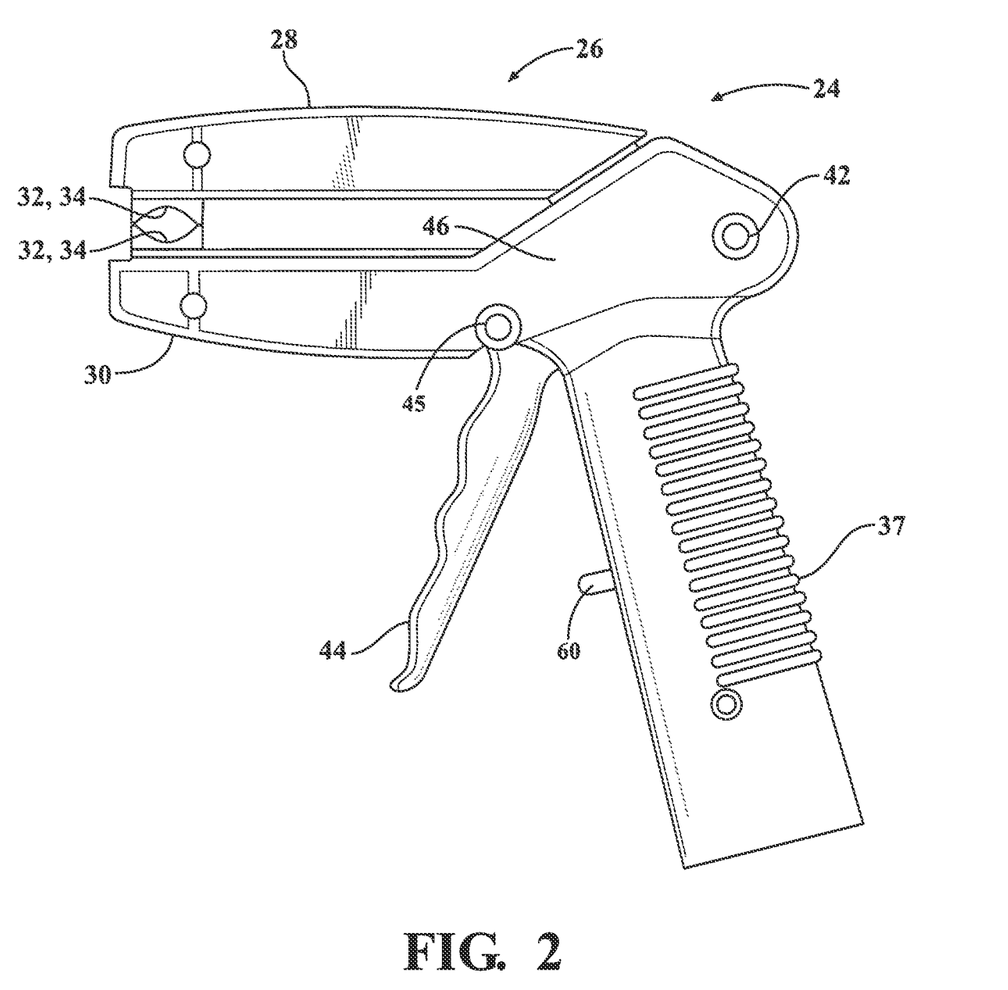
FIG. 2 is side view of a clamping tool constructed in accordance with one aspect of the invention for fixing the protective textile sleeve about the elongate member to be protected with a lever of the clamping tool shown in a non-activated position and clamp members of the clamping tool shown in a closed position.
Figure 3:
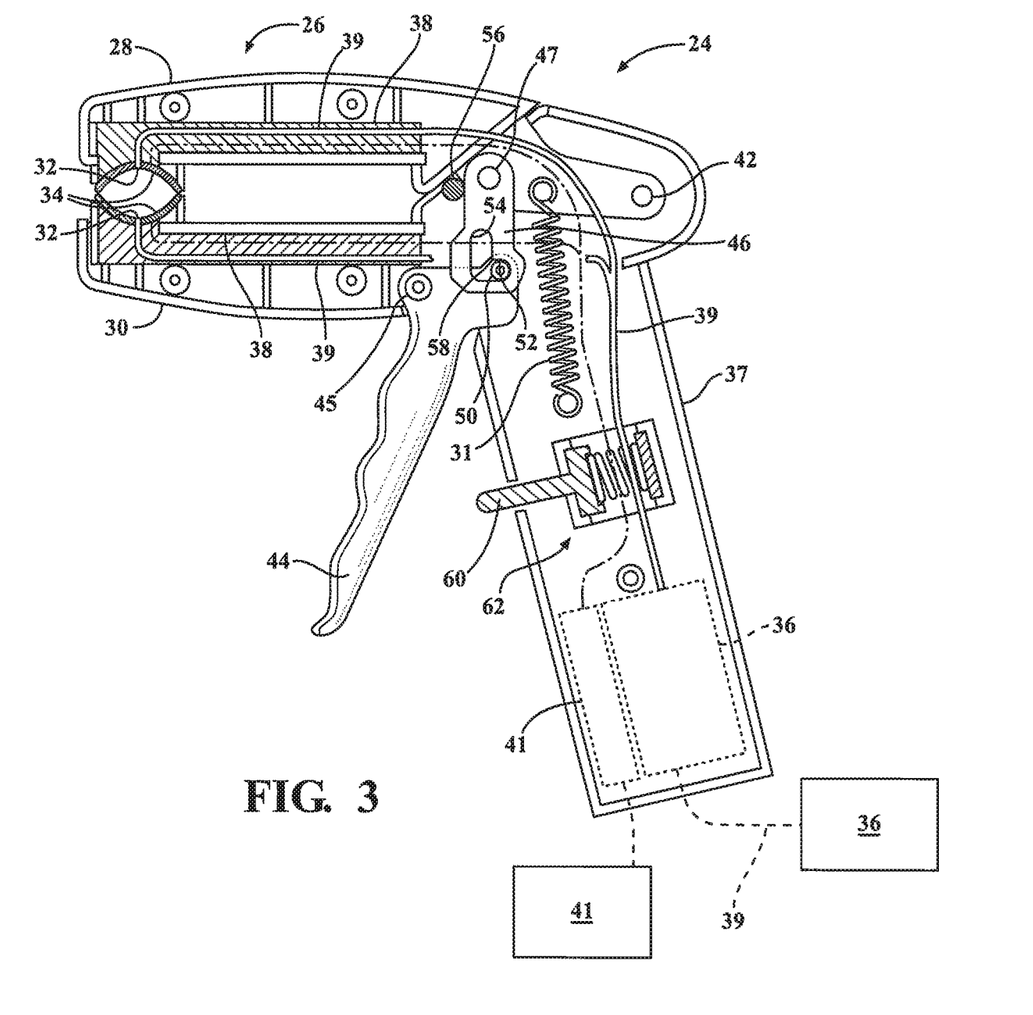
FIG. 3 is a view of the clamping tool of FIG. 2 shown with a portion of a cover removed therefrom to show internal features of the clamping tool.
Figure 4:
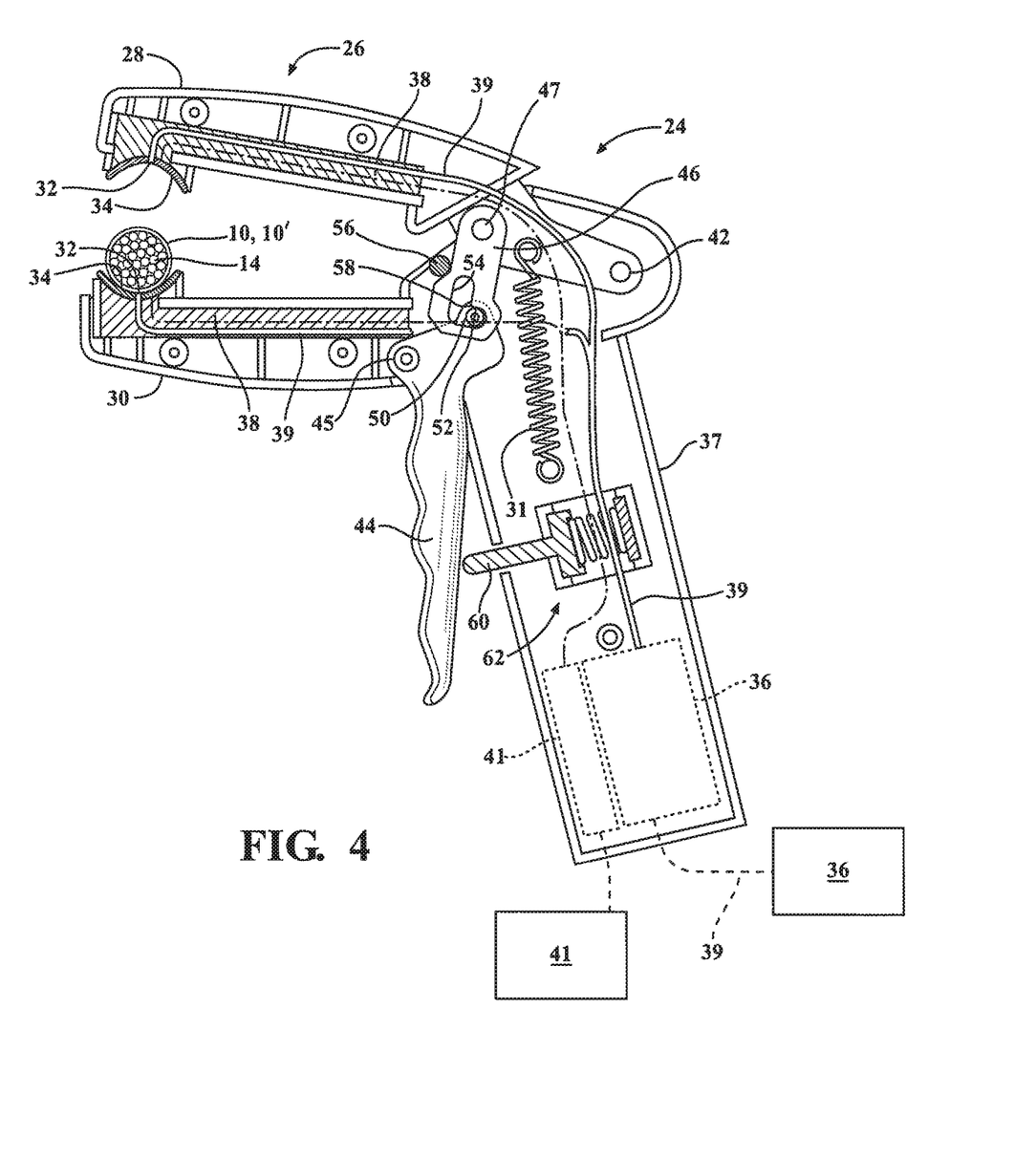
FIG. 4 is a view similar to FIG. 3 with the lever of the clamping tool shown in a partially-activated position and clamp members shown in an open position with an elongate member disposed between clamping surfaces of the clamp members.
Figure 5:
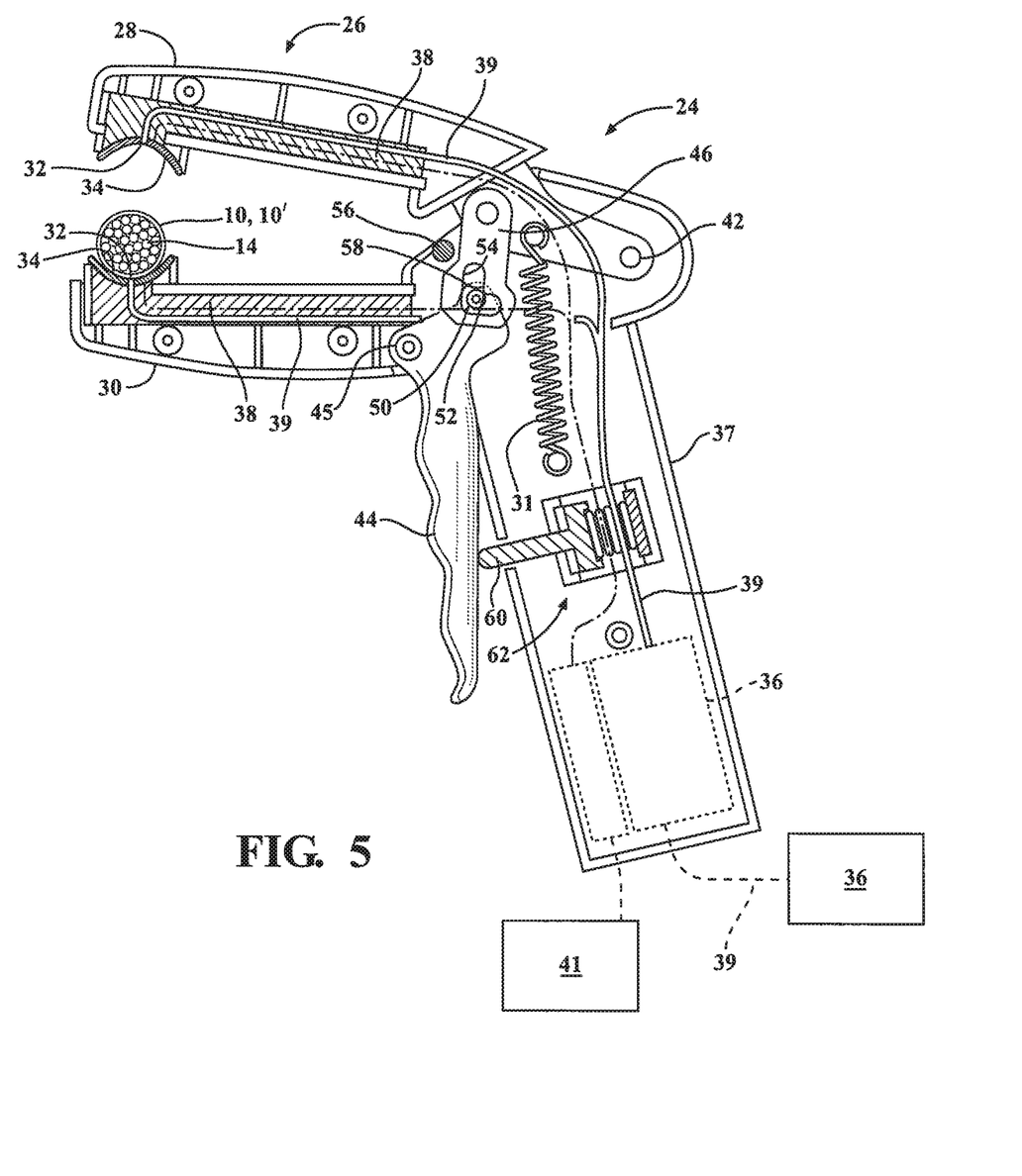
FIG. 5 is a view similar to FIG. 4 with the lever of the clamping tool shown in a position immediately prior to full actuation and clamp members shown in an open position with an elongate member disposed between clamping surfaces of the clamp members.
Figure 6:
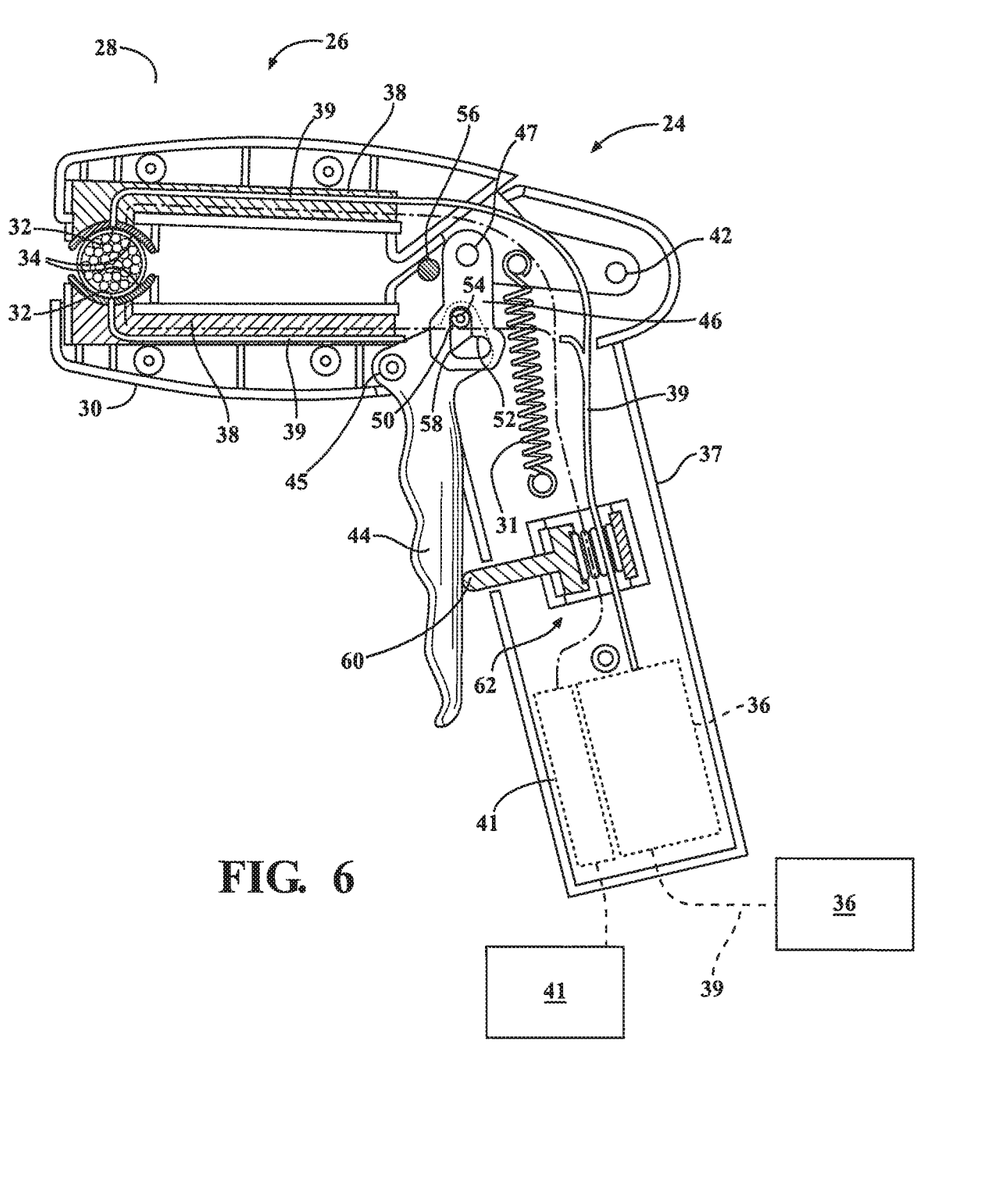
FIG. 6 is a view similar to FIG. 3 with the lever of the clamping tool shown in a fully-activated position and clamp members shown in a closed position bringing the clamping surfaces into abutment with the elongate member.

As the lever 44 is actuated (depressed), such as via manual hand operation or automated operation, the lever 44 is pivoted about the pivot axis 45, thereby causing the pin 50 to move conjointly with the pivoting lever 44, whereupon the pin 50 is caused to rotate in a counterclockwise direction (as viewed in the drawings) against an upper surface of the first arm 52 of the notch 40. As the pin 50 rotates and pushes against an upper surface of the first arm 52, the link mechanism 46 and the clamp member 28 fixed thereto are pushed upwardly against the bias of the spring member 31, thereby stretching the spring 32 and creating increased tension therein, wherein the link mechanism 46 is caused to be translated upwardly along the guide pin 56, thereby causing the clamp members 28, 30 to pivot relative to one another about the pivot axis 42 until the clamp members 28, 30 are brought to the open position (FIGS. 4 and 5). When the clamp members 28, 30 are moved to their open position, the pin 50 is still within the first arm 52 of the notch 40, at least in part, thereby maintain the clamp members 28, 30 in their open position. The clamp members 28, 30 are brought to their fully open position when the lever 44 is depressed to a position between about 50-80 percent toward the handle 37 from its fully non-depressed position (FIGS. 2 and 3). When the clamp members 28, 30 are in their open position, the sleeve 10, 10', with the elongate member 14 disposed therein, can be placed between the jaws 34, and then the lever 44 can be fully depressed and pivoted toward the handle 37. Then, with the sleeve 10, 10' and elongate member 14 in position, subsequent depressing of the lever 44 causes the pin 50 to clear a shoulder 58 (FIG. 5), whereupon the pin 50 is received in the second arm 54 of the notch 48, thus allowing the link mechanism 46 to suddenly descend, and thereby allowing the clamp members 28, 30 to return automatically under the bias of the spring member 31 to their closed or clamped position (FIG. 6), whereupon a uniform, repeatable clamping force is applied about the sleeve 10, 10' via the bias of the spring member 31. Accordingly, with the spring constant of the spring member 31 being known, the clamping force is repeatable and constant from one sleeve 10, 10' to another. With the sleeve 10, 10' clamped between the jaws 34, the heat source 38 is activated, such as via depressed actuation of a plunger mechanism 60 of an actuator valve mechanism 62 via engagement with the lever 44, whereupon steam from the fluid source 36, such as water, is generated and dispensed outwardly through the outlets 32 in the jaws 34. The steam penetrates through the wall 12, 12' of the sleeve 10, 10', thereby coming into contact with the heat and/or water activateable adhesive coating 22. The steam causes the adhesive coating 22 to become activated and at least partially melted, thereby causing the adhesive 22 to bond with the adjacent abutting surface, whether another portion of the sleeve wall 12, and/or the outermost surface 23 of the elongate member 14. Then, the lever 44 is released, whereupon the bias imparted by the spring member 31 causes the lever 44 and clamp members 28, 30 to return to their closed, non-activated state (FIGS. 2 and 3). The entire coating activation process can take as few as about 2-4 seconds, by way of example and without limitation. The time or duty cycle is pre-settable, and can be monitored and regulated automatically via an audible buzzer and LED lighting. As such, the process is quick and economical. It should be recognized the clamping tool 24 can be set-up to be manually held by hand and activated by hand, or it can be fixed in place, such as in an assembly line, and automated for actuation via automated electronic control. The clamping tool 24 can be used in a wide variety of sleeve diameters, such as from as small as about 3 mm in diameter and larger.

Many modifications and variations of the present invention are possible in light of the above teachings. It is, therefore, to be understood that the invention may be practiced otherwise than as specifically described, and that the scope of the invention is defined by any ultimately allowed claims.

What is claimed is:

1. A tool for fixing a protective textile sleeve about an elongate member disposed therein, comprising:
   a clamp assembly having opposed clamp members attached to one another for pivotal movement relative to one another between an open state and a closed state, said clamp members having clamping surfaces, at least one of said clamping surfaces having at least one outlet;
   a fluid source arranged in fluid communication with said at least one outlet; and
   a heat source configured to heat fluid from said fluid source to form steam, said steam being dispensable outwardly from said at least one outlet; and
   wherein said clamping surfaces having concave surfaces facing one another, said concave surfaces being configured for receipt of the protective sleeve therebetween, wherein said clamp members are spring biased toward one of said open and closed states.

2. The tool of claim 1, wherein said at least one outlet is provided as a plurality of outlets.

3. The tool of claim 1, wherein each of said clamp members includes said at least one outlet.

4. The tool of claim 1, further including a handle operably attached to said opposed clamp members, said source of fluid being at least partially contained in said handle.

5. The tool of claim 4, wherein said source of fluid is contained entirely within said handle.

6. The tool of claim 4, wherein said source of fluid is contained at least in part externally from said handle.

7. The tool of claim 1, wherein said tool is configured to be hand held.

8. The tool of claim 1 wherein said tool is operably fixed in place for use in an assembly line.

9. The tool of claim 1 wherein said tool includes a lever pivotally attached to one of said clamp members, said lever having a fully released position, a fully compressed position, and an intermediate position, said clamp members being moved against a bias of a spring member into said open state when said lever is in said intermediate position and being biased by said spring member into said closed state when said lever is in said fully released and fully compressed positions.

10. The tool of claim 1 wherein said clamp members are spring biased toward said open state.

11. The tool of claim 1 wherein said clamp members are spring biased toward said closed state.

* * * * *